United States Patent

[11] 3,542,100

[72] Inventor Joseph S. Choat
Rte 1 Box 358, Odenville, Alabama 35120
[21] Appl. No. 762,040
[22] Filed Sept. 24, 1968
Continuation-in-part of Ser. No. 611,936,
Jan. 26, 1967, now Pat. No. 3,493,020
[45] Patented Nov. 24, 1970

[54] SHEAR-TYPE TREE CUTTING DEVICE WITH JAW LOCK
9 Claims, 6 Drawing Figs.
[52] U.S. Cl. .................................................. 144/34,
144/3
[51] Int. Cl. ..................................................... A01g 23/08
[50] Field of Search ........................................ 144/2-
—(21), 3—(4), 34—(5), 309—(34)

[56] References Cited
UNITED STATES PATENTS
2,751,943 6/1956 Ford .......................... 144/34

Primary Examiner—Gerald A. Dost
Attorney—Clarence A. O'Brien And Harvey B. Jacobson ABSTRACT: An elongated frame including tree clamping jaws at one end and a shear-type cutting blade movable along the frame from an inactive position remote from the jaws and an active position cooperable with the jaws to shear a tree member clampingly engaged by the jaws, the jaws being powered by fluid motors, openable away from the cutting blade and including mechanical interlock means, actuated automatically by the fluid motors upon their shifting the jaws to closed positions, for locking the jaws in their closed positions independent of the fluid motors.

Patented Nov. 24, 1970

Joseph S. Choat
INVENTOR.

BY *Clarence A. O'Brien*
*and Harvey B. Jacobson*
Attorneys

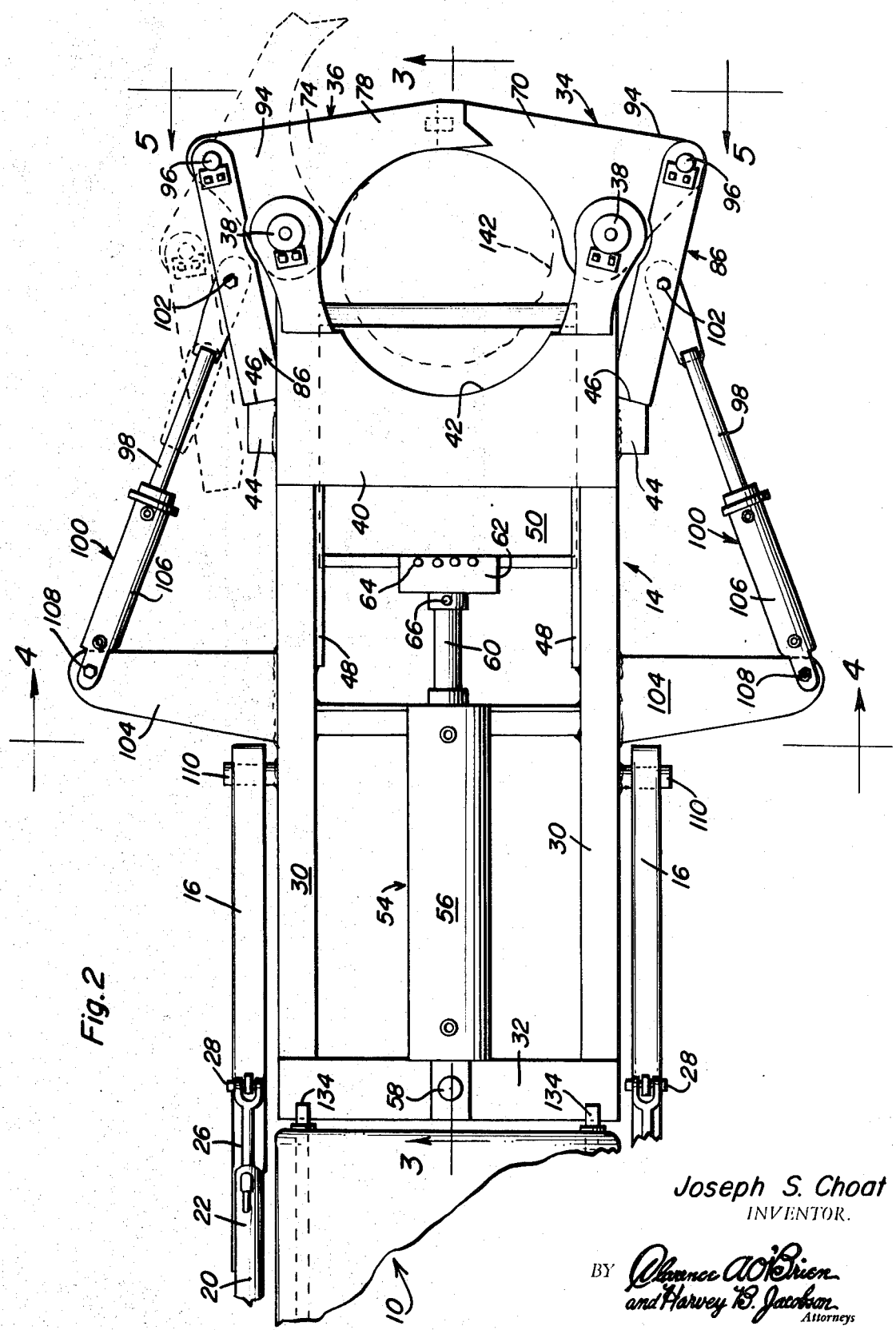
Patented Nov. 24, 1970 — 3,542,100 — Sheet 2 of 3 — Fig.2
Joseph S. Choat
INVENTOR.

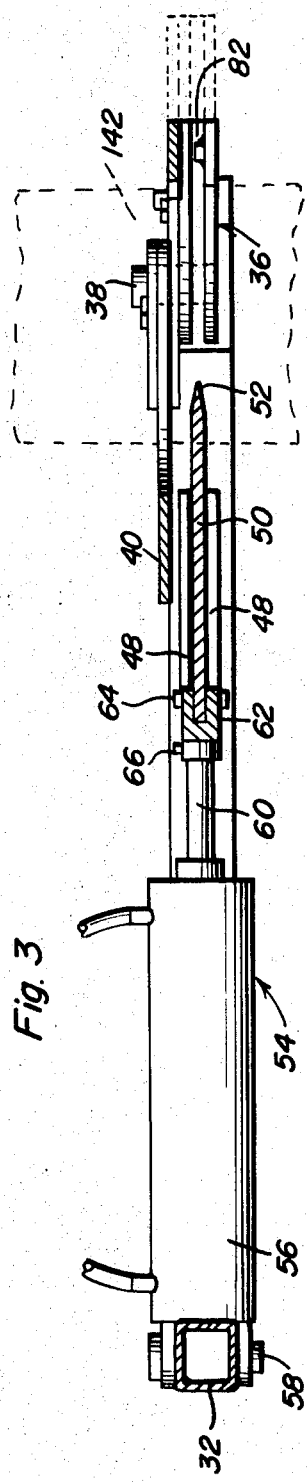

SHEAR-TYPE TREE CUTTING DEVICE WITH JAW LOCK

This application comprises a continuation-in-part application of my copending U.S. application, Ser. No. 611,936, for SHEAR-TYPE TREE CUTTING DEVICE, filed Jan. 26, 1967, now U.S. Pat. No. 3,493,020.

This invention relates to a novel and useful shear-type tree cutting device to be used in conjunction with and supported from the forward end of a powered mobile platform of the type maneuverable through heavily wood areas.

The tree cutting device is constructed in a manner whereby it is readily positionable adjacent and adapted to horizontally shear the lower part of an upstanding tree trunk of considerable diameter, depending upon the size and power of the tree cutting device provided. In addition, after felling a tree the tree cutting device of the instant invention is, by its supporting mobile platform, movable along the trunk of a fallen tree and is operable to cut, by vertical shearing the fallen tree trunk into a plurality of sections of predetermined length. Still further, the tree cutting device of the instant invention includes a pair of jaw members adapted to clampingly engage and encircle one-half of a tree trunk to be cut and also a shear blade facing and movable toward and away from the side of an associated tree trunk not embraced by the jaw members for shearing the tree trunk and the jaw members are also adapted to clampingly engage ground supported horizontal tree trunk sections with a pincerlike action whereby the associated mobile platform may be utilized to drag the cut tree trunk sections from the immediate area in which a tree has been felled to an adjacent area in which the cut tree trunk sections may be more readily handled by other equipment and loaded onto suitable conveyances for transport to a more distant location.

The tree cutting device of the instant invention includes an elongated generally rectangular support or frame including a pair of generally quarter circular jaw members pivotally supported from opposite sides of one open end of the frame for movement toward and away from each other and which close the corresponding end of the frame when the jaw members are moved toward each other to the closed or active positions. These jaw members are adapted to clampingly engage and encircle the side of a tree trunk remote from the side thereof toward which the one end of the frame is forwardly advanced and the frame includes a shearing blade slidingly supported therefrom which faces and is movable toward the end of the frame from which the jaw members are supported from the other end thereof and into cooperable relationship with a tree trunk held captive by the jaw members for shearing the tree trunk.

The frame of the tree cutting device is supported from its mobile platform for shifting between a low horizontally disposed position with the jaw end of the frame projecting forwardly of the mobile platform and a raised vertically disposed position with the jaw end of the frame disposed lowermost and the jaw members positioned in and swingable through upstanding planes extending transversely of a path in which the mobile platform is forwardly movable.

The main object of this invention is to provide a tree cutting device operable to quickly fell trees of a given size.

Another object of this invention is to provide a tree cutting device which may be readily supported from various mobile platforms which are readily removable through heavily wooded areas.

Another very important object of this invention is to provide a tree cutting device in accordance with the preceding objects and which includes a shear blade and jaw members for tightly clampingly embracing the side of a tree trunk remote from the sides thereof against which the shear blade is advanceable, whereby once the tree cutting device is engaged with a tree trunk to be sheared no motive power of the supporting mobile platform for the tree cutting device is required to maintain the cutting device properly associated with the tree trunk being sheared.

Another object of this invention is to provide a tree cutting device which will be operative to fell trees and then cut the trunk portion thereof into short sections without requiring an operator other than the single operator required to operate the tree cutting device and its supporting mobile platform.

A final object of this invention to be specifically enumerated herein is to provide a shear-type tree cutting device in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged fragmentary plan view of the assemblage illustrated in FIG. 1 and with an alternate open position of one of the jaws of the tree cutting device illustrated in phantom lines;

FIG. 3 is a longitudinal vertical sectional view taken substantially upon the plane indicated by section line 3–3 of FIG. 2;

FIG. 4 is a transverse vertical sectional view taken substantially upon the plane indicated by the section line 4–4 of FIG. 2;

FIG. 5 is a fragmentary front elevational view taken substantially upon the plane indicated by the section line 5–5 of FIG. 2; and FIG. 6 is an enlarged perspective view of one of the jaw actuating and locking levers of the tree cutting device.

Figure 1:
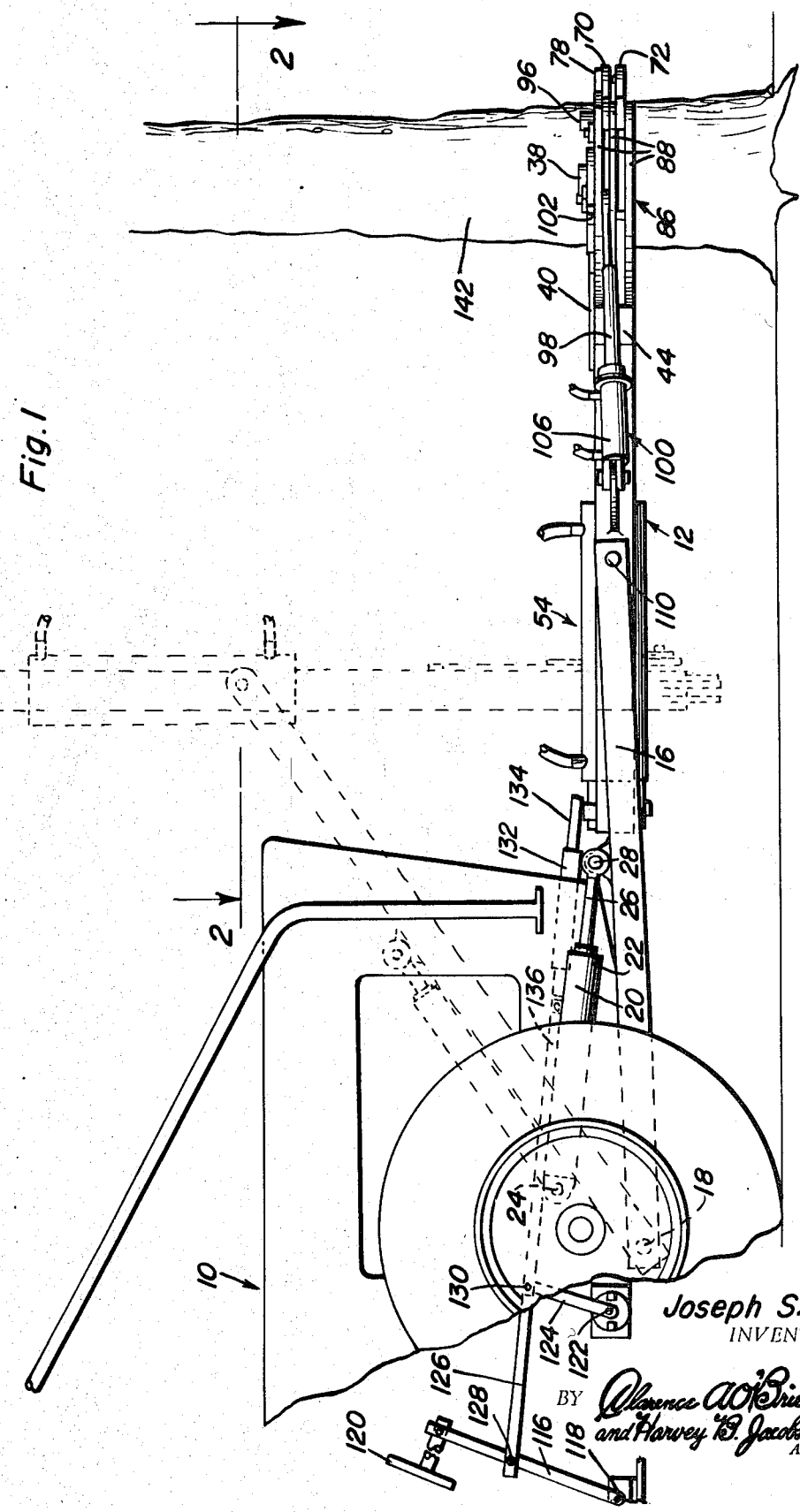
FIG. 1 is a fragmentary side elevational view of the front end of a conventional pneumatic tired tractor upon which the tree cutting device of the instant invention is mounted with the tree cutting device being operatively positioned relative to an upright tree trunk for shearing the latter and an alternate felled tree trunk cutting position of the shearing device illustrated in phantom lines.

Referring now more specifically to the drawings the numeral 10 generally designates a conventional form of pneumatic tire tractor. The tree cutting device of the instant invention is generally referred to by the reference numeral 12 and includes an elongated generally rectangular frame or support referred to in general by the reference numeral 14. The rear ends of a pair of lift arms 16 are pivotally secured to opposite sides of the vehicle 10 as at 18 and a pair of hydraulic cylinders 20 have the base ends of their cylinder portions 22 pivotally secured to the vehicle 10 as at 24 and the free ends of their piston rod portions 26 pivotally secured to the lift arms 16 centrally intermediate their opposite ends as at 28. Accordingly, the hydraulic cylinders, which may be operated by any suitable control means, may be utilized to raise and lower the lift arms 16 between the lowered solid line positions thereof illustrated in FIGS. 1 and 2 of the drawings and the raised dotted line position illustrated in FIG. 1 of the drawings.

The frame or support 14 includes a pair of opposite side longitudinal members 30 interconnected at their rear ends by means of a rear transverse member 32 and from whose forward ends a pair of jaw members generally referred to by the reference numerals 34 and 36 are pivotally supported as at 38. The front ends of the longitudinal members 30 are also interconnected by means of an upper transversely extending plate 40 secured and extending therebetween and including a forwardly opening generally semicylindrical notch or recess 42. In addition, the forward ends of the longitudinal members 30 include opposite side outwardly projecting abutment blocks 44 including upstanding and slightly outwardly and rearwardly inclined abutment faces 46.

Each of the longitudinal members 30 includes a pair of upper and lower longitudinally extending flanges or guides 48 which extend along and project inwardly from the inner surfaces of the longitudinal members 30. A heavy-duty platelike shearing blade 50 has its opposite side portions slidingly received in the channels defined by the pairs of flanges or guides 48 for reciprocal movement of the shearing blade 50 longitudinally of the frame or support 14. The forward edge of the blade 50 is sharpened as at 52 and a heavy-duty hydraulic cylinder 54 has the base end of its cylinder portion 56 pinned to the rear transverse member 32 as at 58 and the free end of its piston rod portion 60 secured to the center of the rear marginal edge portion of the shearing blade 50 by means of a rear reinforcing channel member 62 secured to the rear marginal edge portion of the blade 50 as at 64 and to which the piston rod portion 60 is secured as at 66.

Of course, the cylinders and 54 may be powdered by any suitable source of hydraulic fluid under pressure such as a hydraulic pump driven by the prime mover of the tractor or mobile platform 10.

The jaw member 34 includes a pair of upper and lower plates 70 and 72 which are secured together in spaced apart relation and the jaw member 36 includes a pair of upper and lower plates 74 and 76 which are also secured together in spaced apart relation. The plate 74 has a lap plate 78 secured to its free end portion which is adapted to lap over the free end of the plate 70 when the jaw members 34 and 36 are closed and the plate 72 includes a smaller lap plate 80 for lapping over the plate 76 and abutment with the abutment block 82 when the jaw members 34 and 36 are closed.

A pair of actuating and locking levers generally referred to by the reference numerals 86 are provided and each consists of three vertically spaced plates 88 which are secured together with blocks 90 and 92 disposed therebetween. One set of corresponding ends of the levers 86 are secured to the remote outer wind portions 94 of the jaw members 34 and 36 as at 96 and the free ends of the piston rod portions 98 of a pair of hydraulic cylinders generally referred to by the reference numerals 100 are secured to the levers 86 intermediate their opposite ends as at 102. Each of the longitudinal members 30 includes an outwardly projecting mounting lug 104 to which the base end of the cylinder portion 106 of the corresponding hydraulic cylinder 100 is pivotally secured as at 108. Of course, the hydraulic cylinders 100 may also be powered from any suitable remote source of hydraulic fluid under pressure.

Each of the longitudinal members 30 also includes a pair of oppositely outwardly projecting pivot shaft portions 110 which are journaled through the forward ends of the lift arms 16 and accordingly, the frame or support 14 is mounted for swinging through a vertical plane from and with the free forward ends of the lift arms 30 upon actuation of the hydraulic cylinders 20. Of course, the frame or support 14 is also swingable relative to the lift arms 16 about the axis of rotation defined by the alined pivot shafts or shanks 110.

The tractor 10 includes an operating lever 116 pivotally supported from the tractor 10 as at 118 and which includes a foot engageable pedal 120 on its free swingable end. A transverse shaft 122 is journaled from the tractor 10 and includes a pair of opposite end crank arms 124 and a connecting rod 126 has its opposite ends pivotally secured to the lever 116 as at 128 and to the free end of the right-hand crank arm 124 as at 130. A pair of spring loaded guide sleeves 132 are supported on opposite sides of the front end of the tractor 10 and slidingly receive locking rods 134 therethrough whose rear ends are operatively connected to the free ends of the corresponding crank arms 124 by means of a pair of connecting rods 136 whose opposite ends are pivotally secured to the free ends of the crank arms 124 and the rear ends of the locking rods 134. The forward ends of the locking rods 134 are projectable forwardly from the guide sleeves 132 by forward foot pressure being applied to the pedal 120 to overlie the opposite ends of the rear transverse member 32 and prevent upward swinging movement of the rear end of the frame or support 14 relative to the tractor 10 when the frame 14 and the lift arms 16 are in the lowered horizontal disposed positions illustrated in FIGS. 1 and 2 of the drawings. The pivot shanks or pins 110 are positioned along the longitudinal members 130 rearward of the center of gravity of the frame or support 14 and therefore the forward end of the frame or support normally has a tendency to swing downwardly so that the frame or support 14 is vertically disposed as illustrated in phantom lines in FIG. 1 of the drawings.

In operation, assuming that the frame or support 14 is in the phantom line position illustrated in fig. 1 of the drawings, the tractor 10 may be moved through a heavily wooded area to a tree that is to be cut down. Then, the tractor 10 may be reversed as the lift arms 16 are lowered whereby the jaw end of the frame or support 14 will contact the ground and the rearward movement of the tractor 10 will swing the upper or rear end of the frame or support 14 rearwardly and downwardly toward the ground until the frame or support 14 is a horizontal position below that horizontal position illustrated in FIG. 1 of the drawings. Then, the pedal 120 may be pushed forwardly and the lift arms 16 may be raised until they are positioned as illustrated in solid lines in FIG. 1 of the drawings with the frame or support 14 also horizontally disposed. Frictional engagement of the rear transverse member 32 with the elements 134 will prevent their automatic retraction from the operative position thereof illustrated in FIG. 1 of the drawings and thereby retain the frame or support 14 in the horizontal position. Then, the fluid motors 110 may be retracted so as to open the jaw members 34 and 36 after which the vehicle 10 may be advanced toward the tree 142 so as to seat the tree 142 in the recess 42. Thereafter, the fluid motors 100 may be extended so as to swing the jaw members 34 and 36 to the closed position thereof illustrated in FIG. 2 of the drawings with the jaw members 34 and 36 clampingly disposed about and embracing the side of the tree 142 remote from the recess 42. Of course, while the tree cutting device 12 is being properly positioned relative to the tree 142, the hydraulic cylinder 54 is fully retracted so as to shift the cutting blade 50 to its rearmost retracted position.

After the tree cutting device 12 has been properly engaged with the tree 142, the cylinder 54 may be extended so as to force the shearing or cutting blade 50 into contact with the tree 142 so as to shear the latter. It will of course be appreciated that final forward movement of the cutting blade 50 slides the leading edges of the cutting blade 50 between the upper plates 70 and 74 of the jaw members 34 and 36 and the lower blades 72 and 76 of the jaw members whereby no interference between the cutting blade 50 and the jaw members 34 and 36 is encountered. Further, the rear ends of the actuating and locking levers 86 are free and slip inwardly of the forward abutment faces 46 of the abutment blocks 44 as the jaw members 34 and 36 are swung to their fully closed positions. The rear ends of the actuating and locking levers 86 are coplanar and disposed in surface-to-surface abutting relation with the abutment faces 46 during the shearing operation and therefore resist all tendency of the jaw members 34 and 36 to swing to the open positions. It will be observed from FIG. 2 of the drawings that the abutment faces 46 are inclined slightly from positions normal to the longitudinal centerlines of the locking levers 86 and therefore the rear ends of the locking levers 86 are prevented from slipping outwardly from engagement with the abutment faces 46 during the shearing operation. However, inasmuch as the locking levers 86 are inclined relative to the longitudinal centerlines of the fluid motors 100 when the jaws 34 and 36 are in their closed positions, actuation of the hydraulic cylinders 100 to retract the same effects an outward pull on the rear ends of the actuating levers 86 so as to swing the rear end faces of the levers 86 from engagement with the forward abutment faces 46 of the abutment block 44. On the other hand, due to the relative inclination of the hydraulic cylinders 100 and the locking levers 86, during extension of the cylinders 100 to swing the jaw members 34 and 36 to the closed positions the inner side edges of the rear end portions of the locking levers 86 slide along the abutment block 44 until the rear ends of the locking levers 86 are registered with the abutment faces 46 at which point the rear ends of the levers 86 are swung inwardly in front of the abutment faces 46. Accordingly, there is no force applied on the cylinders 100 during the shearing operation required to maintain the jaw members 34 and 36 closed inasmuch as all tendency of the jaw members 34 and 36 to swing from the closed positions is resisted by the endwise abutting of the actuating and locking levers 86 with the forward abutment faces 46 of the abutment blocks 44.

After the tree 142 has been felled, the lift arms 16 and the frame or support 14 may be disposed as illustrated in phantom lines in FIG. 1 of the drawings and the tractor 10 may be advanced along the felled tree 142 and intermittently stopped so that the jaw members 34 and 36 may be engaged with the fallen tree and the latter may be sheared into appropriate shorter sections.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A cutting device comprising an elongated support including jaw means at one end shiftable between closed and open positions shifted toward and away from the other end of said support, respectively and adapted, when closed to clampingly engage an elongated member specifically orientated relative to and disposed between said jaw means and the other end of said support, a shear-type cutting blade supported from said support, facing said jaw means and shiftable along said support from an inactive position remote from said jaw means to a position adjacent and cooperable with said jaw means to shear said elongated member, motor means, connecting means operatively connecting said motor means, between said support and said jaw means, said motor means and said connecting means being operable to shift said jaw means between open and closed positions and including interlock means actuated automatically, upon operation of said motor means to close said jaw means, for locking said jaw means in the closed position independent of said motor means.

2. The combination of claim 1 wherein said support includes means adapting said support to be supported for oscillation about a horizontal axis extending transversely of said support through an arc of generally 90° whereby said support may be swung between a horizontal position and an upstanding position with said one end disposed lowermost.

3. The combination of claim 2 wherein said cutting device includes a base defining a mobile platform movable endwise in at least one direction, the last mentioned means including arms means pivotally secured at one end to the leading end of said platform for swinging about a horizontal transverse axis and from whose other end said support is pivoted for rotation about a horizontal axis extending transversely of said platform.

4. The combination of claim 3 including means connected between said platform and said arm means operative to raise and lower said other end of said arm means.

5. The combination of claim 4 including releasable lock means operable to prevent rotation of said support relative to said arm means from a horizontal position of said support to lower said one end thereof when said arm means are lowered.

6. In combination with a mobile platform movable endwise over the ground in at least one direction in which one end precedes the other, a forwardly projecting generally horizontal arm assembly pivotally secured at its rear end to the forward end portion of said platform for rotation about a horizontal transverse axis, an elongated frame pivotally secured to the forward end portion of said arm assembly for rotation about an axis generally paralleling the first-mentioned axis and extending transversely of said frame, one end of said frame, including endwise outwardly opening tree trunk gripping means adapted to at least partially encircle erect and fallen tree trunks when said frame is horizontally and vertically disposed, respectively, and a shear-type cutting blade longitudinally reciprocally supported from said frame and shiftable between an inactive position remote from said gripping means and an active position cooperating with said gripping means to cut, by shearing, a tree trunk engaged by said gripping means, said one end of said frame defining an endwise outwardly opening recess, said tree trunk gripping means comprising generally quarter circular jaw members pivotally supported at one pair of corresponding inner ends to opposite sides of said one end of said frame swingable toward and away from each other at their other outer ends to define and close and open the outer extremity of said recess, motor means, connecting means operatively connecting said motor means between said frame and said jaw members, said motor means and said connecting means being operable to shift said jaw members between open and closed positions and including interlock means, actuated automatically, upon operation of said motor means to close said jaw members, for locking the latter in the closed positions independent of said motor means.

7. The combination of claim 6 wherein said interlock means includes a positive mechanical connection between said jaw members and said frame when said interlock means is operative.

8. A shearing device comprising an elongated support defining an endwise outwardly opening recess at one end, a pair of generally quarter circular jaw members pivotally supported from opposite sides of said one end of said support for movement toward each other between closed closely adjacent positions defining and closing the outer extremity of said recess and movement apart and outwardly of said one end of said support opening the outer extremity of said recess, shear blade means mounted on said support for movement therealong from inactive positions remote from said jaw members and active positions adjacent and cooperable with said jaw members to shear an object captively retained in said recess by said jaw members, motor means supported from said support and connected to said jaw members for opening and closing the latter, and interlock means automatically operable to lock said jaw members in said closed positions independent of said motor means upon actuation of the latter to move said jaw members to the final closed positions.

9. The combination of claim 8 wherein said interlock means includes a positive mechanical connection between said jaw members and said frame when said interlock means is operative.